(12) United States Patent
Lund et al.

(10) Patent No.: US 7,287,616 B2
(45) Date of Patent: Oct. 30, 2007

(54) TRANSMISSION CASE AND DIPSTICK ASSEMBLY

(75) Inventors: Ben M. Lund, Wales, WI (US); Robert P. Marino, Waukesha, WI (US); John Schanz, Mequon, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 151 days.

(21) Appl. No.: 11/174,445

(22) Filed: Jul. 1, 2005

(65) Prior Publication Data

US 2007/0000706 A1    Jan. 4, 2007

(51) Int. Cl.
    *G01F 23/04* (2006.01)
(52) U.S. Cl. .................. 180/219; 73/290 R
(58) Field of Classification Search .......... 180/219; 73/290 R; 74/606 R
    See application file for complete search history.

(56) References Cited

U.S. PATENT DOCUMENTS 3,636,510 A * 1/1972 Winfield .................. 340/450.3
4,850,878 A * 7/1989 Perotti ..................... 434/374
5,014,445 A * 5/1991 Martell ..................... 33/731
5,062,447 A * 11/1991 Davison et al. ............ 137/493
5,129,422 A * 7/1992 Davison et al. ........ 137/599.09
6,301,947 B1 * 10/2001 McCombs, Jr. ............ 72/295
2005/0133306 A1 * 6/2005 Lochocki, Jr. ............. 184/106

OTHER PUBLICATIONS

Fig. A illustrates an admitted prior art oil fill neck, Jun. 2005.
Fig. B illustrates an admitted prior art oil fill neck, Jun. 2005.

* cited by examiner

*Primary Examiner*—Kevin Hurley
(74) *Attorney, Agent, or Firm*—Michael Best & Friedrich LLP

(57) ABSTRACT

The present invention provides a motorcycle including a front wheel, a rear wheel, a frame supported by the front and rear wheels, a crankcase, a transmission case coupled to the crankcase, a transmission access door coupled to a side of the transmission case, and a dipstick assembly coupled to the side of the transmission case. The dipstick assembly is positioned between the crankcase and the transmission access door.

14 Claims, 6 Drawing Sheets

US 7,287,616 B2

TRANSMISSION CASE AND DIPSTICK ASSEMBLY

FIELD OF THE INVENTION

This invention relates generally to motorcycles, and more particularly to motorcycle transmissions.

BACKGROUND OF THE INVENTION

Motorcycle transmissions occasionally include a transmission case and a fill spout coupled to the transmission case. The fill spout communicates with an internal passageway in the transmission case leading to a sump containing lubricant. To add lubricant to the sump, the lubricant is poured into the fill spout. From the fill spout, the lubricant flows down the internal passageway and collects in the sump.

When fill spouts are constructed of separate components or assemblies they are fastened to transmission cases by fasteners to achieve a consistent clamping force around the periphery of a flat gasket positioned between the fill spout and the transmission case. Also, fill spouts in motorcycle transmissions are occasionally integrated into transmission case covers coupled to upper portions of transmission cases.

SUMMARY OF THE INVENTION

The present invention provides, in one aspect, a motorcycle including a front wheel, a rear wheel, a frame supported by the front and rear wheels, a crankcase, a transmission case coupled to the crankcase, a transmission access door coupled to a side of the transmission case, and a dipstick assembly coupled to the side of the transmission case. The dipstick assembly is positioned between the crankcase and the transmission access door.

The present invention provides, in a further aspect, a transmission case assembly adapted for use with a motorcycle. The transmission case assembly includes a transmission case including a passageway exposed to a side of the transmission case, a reservoir coupled to the transmission case and in fluid communication with the passageway. The reservoir is adapted to contain a lubricant. The transmission case assembly also includes a dipstick assembly sealingly coupled to the passageway. The dipstick assembly is connected to the side of the transmission case by a single fastener.

The present invention provides, in another aspect, a transmission case assembly adapted for use with a motorcycle. The transmission case assembly includes a transmission case having a passageway exposed to a side of the transmission case, a reservoir coupled to the transmission case and in fluid communication with the passageway, the reservoir adapted to contain a lubricant, a dipstick assembly including a fill spout coupled to the side of the transmission case and in fluid communication with the passageway and a dipstick coupled to the fill spout, and an O-ring radially compressed between the fill spout and the transmission case to seal the fill spout to the passageway.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
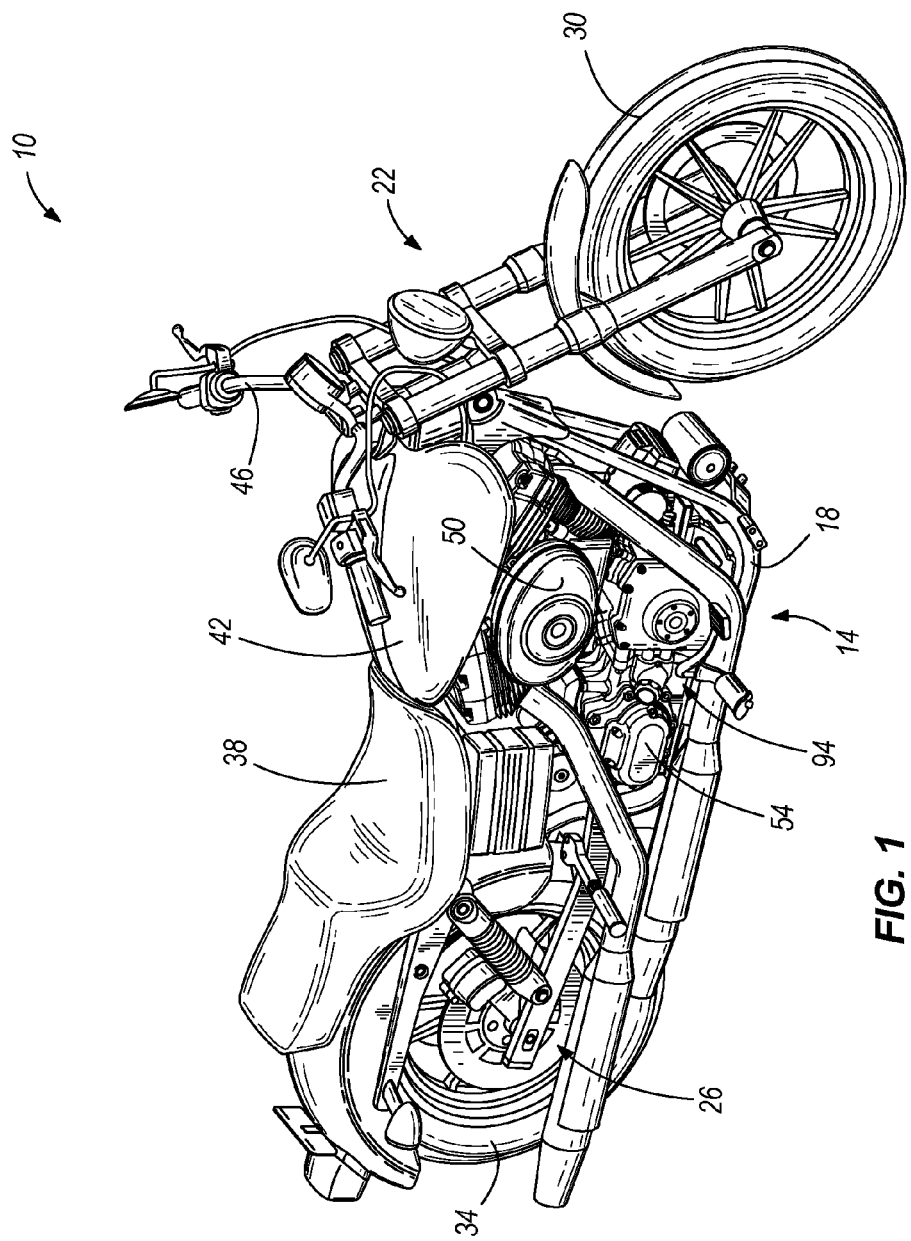
FIG. 1 is a front perspective view of a motorcycle embodying the present invention.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

FIG. 1 illustrates a motorcycle 10 including a drive assembly 14, a frame 18, a front fork assembly 22, a swing arm or rear fork assembly 26, a front wheel 30, a rear wheel 34, a seat 38, and a fuel tank 42. The frame 18 supports the drive assembly 14, the front fork assembly 22, the rear fork assembly 26, the seat 38, and the fuel tank 42. The front fork assembly 22 is pivotally supported at a front end of the motorcycle 10 and supports the front wheel 30. The front fork assembly 22 includes a pair of handle bars 46 for steering the motorcycle 10. The rear fork assembly 26 is coupled to the frame 18 at a rear end of the motorcycle 10 and rotatably supports the rear wheel 34. The seat 38 is coupled to the frame 18 and is configured for supporting a rider. The fuel tank 42 is supported by the frame 18 and provides fuel to the drive assembly 14.

The drive assembly 14 is coupled to the frame 18 beneath the seat 38 between the front wheel 30 and the rear wheel 34 of the motorcycle 10. With continued reference to FIG. 1, the drive assembly 14 includes an engine 50 and a transmission 54. The engine 50 preferably comprises a V-twin engine 50 supported by the frame 18 forward of the transmission 54. The engine 50 includes a crankcase 58 (see FIG. 2), a crankshaft or output shaft (not shown) rotatably supported in the crankcase 58, which includes a primary drive sprocket (not shown) for driving a primary chain (not shown) in a conventional manner to power the transmission 54.

Figure 2:
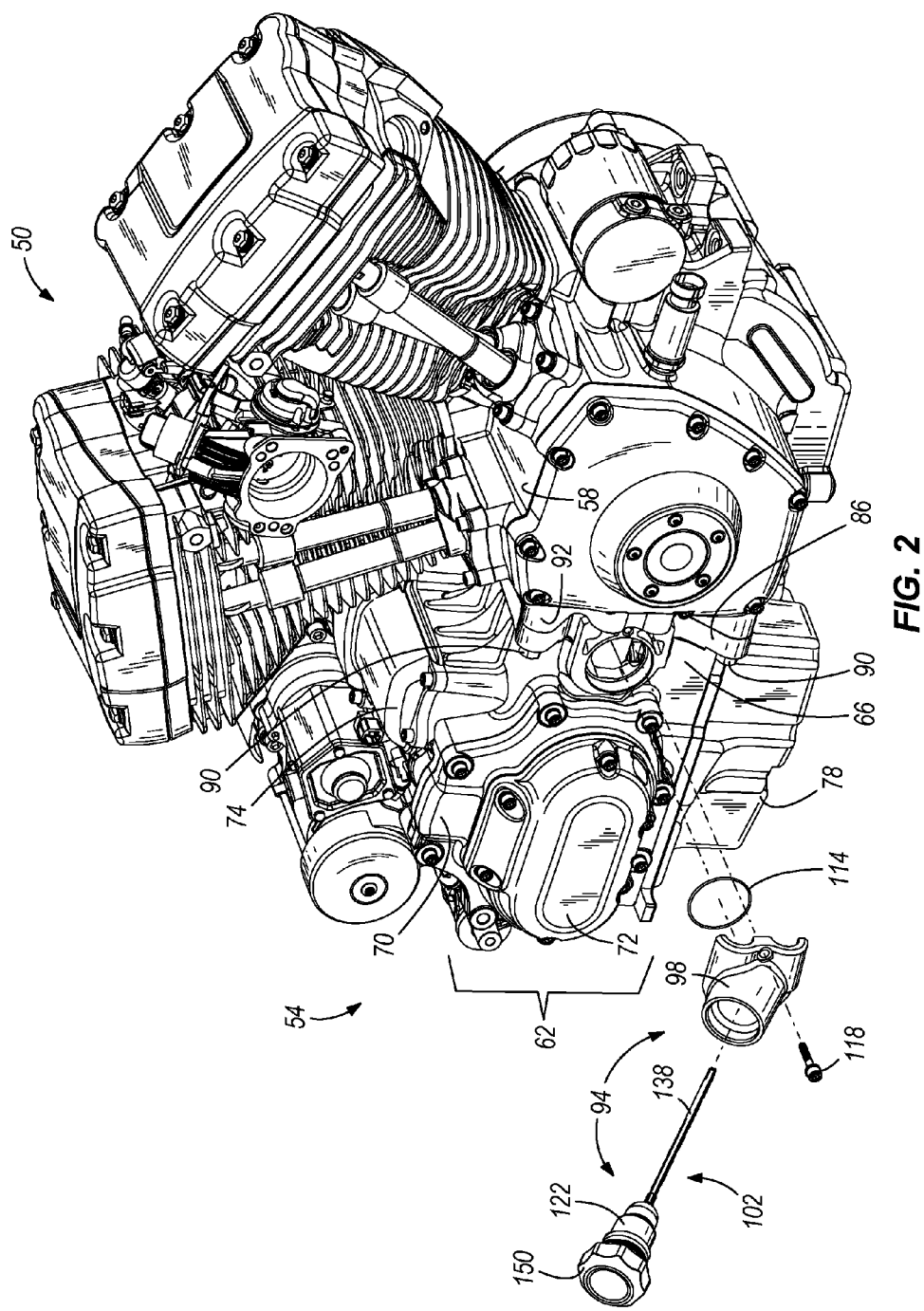
FIG. 2 is an enlarged, front perspective view of an engine and transmission case assembly of the motorcycle of FIG. 1, illustrating a dipstick assembly exploded from a transmission case.

As shown in FIG. 2, the transmission 54 includes a transmission case assembly 62 having a transmission case 66 enclosing the internal components of the transmission 54. A gear chamber (not shown) in the transmission case 66 houses the internal components of the transmission 54, particularly the transmission input and output shafts and various gears (not shown). The transmission case assembly 62 also includes a transmission access door 70 coupled to a side of the transmission case 66. The transmission access door 70 at least partially supports the input and output shafts, and is removable to access the internal components of the transmission 54 discussed above. The transmission case assembly 62 further includes a transmission case side cover 72 coupled to the transmission access door 70, a transmission case top cover 74 coupled to a top portion of the transmission case 66, and a pan 78 coupled to a bottom portion of the transmission case 66. The pan 78 includes a reservoir or sump 82 for containing lubricant (see also FIGS. 3 and 4), which is distributed throughout the engine 50 to lubricate the working components of the engine 50.

Figure 3:
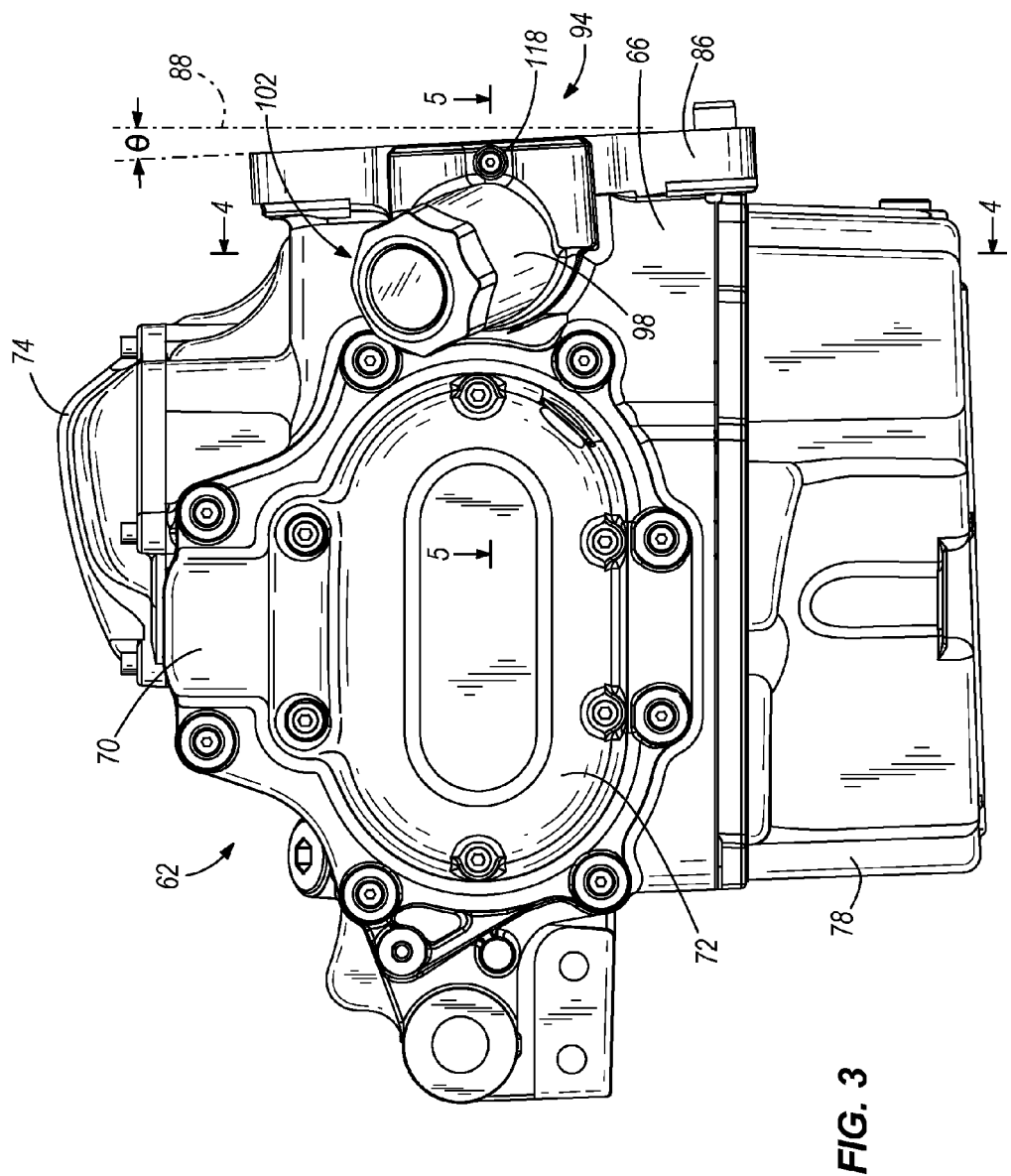
FIG. 3 is an enlarged, side view of the transmission case assembly of the motorcycle of FIG. 1.

With reference to FIG. 2, the transmission case assembly 62 includes a flange 86 on the transmission case 66 for coupling to the crankcase 58. In the illustrated construction, the transmission case 66 is fastened to the crankcase 58 using a plurality of bolts 90. With reference to FIG. 3, the flange 86 is angularly oriented or canted relative to a vertical plane 88 passing through the flange 86. Likewise, a mating flange 92 (see FIG. 2) on the crankcase 58 is canted to receive the flange 86 of the transmission case 66. In the illustrated construction, the flange 86 is canted relative to the vertical plane 88 by an angle θ of about 3 degrees. Alternatively, the flange 86 may be canted relative to the vertical plane 88 more or less than about 3 degrees.

The transmission case assembly 62 also includes a dipstick assembly 94, including a fill spout 98 and a dipstick 102, coupled to the same side of the transmission case 66 as the transmission access door 70. As shown in FIG. 2, the dipstick assembly 94 is coupled to the transmission case 66 at a location between the crankcase 58 and the transmission access door 70. Specifically, the dipstick assembly 94 is coupled to the transmission case 66 at a location adjacent the transmission access door 70 and adjacent the flange 86 (see also FIG. 3).

Figure 4:
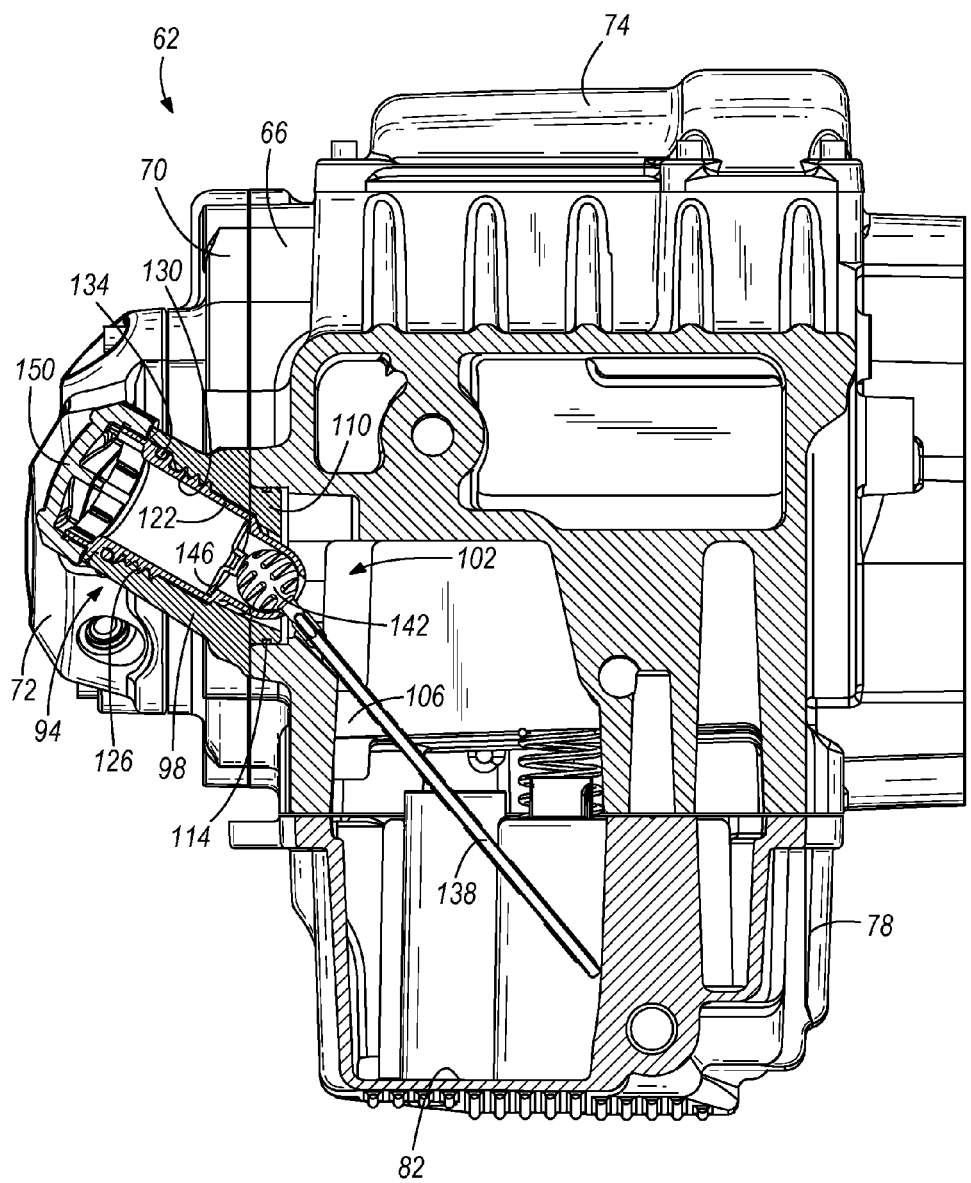
FIG. 4 is a cross-section view taken along line 4-4 of FIG. 3, illustrating the dipstick assembly coupled to the transmission case.

With reference to FIGS. 2 and 4, the dipstick assembly 94 is sealingly coupled to a passageway 106 in the transmission case 66 exposed to the side of the transmission case 66. The passageway 106 is in fluid communication with the sump 82, such that lubricant added to the fill spout 98 flows through the passageway 106 and collects in the sump 82.

As shown in FIG. 4, the dipstick 102 is supported in the fill spout 98 and extends through the passageway 106 and into the sump 82 for indicating the level of lubricant in the sump 82. The dipstick 102 includes a grommet 122 having external threads 126 to engage internal threads 130 formed in the fill spout 98. An O-ring 134 is captured in a groove around the grommet 122 to seal against the fill spout 98 when the grommet 122 is threaded with the fill spout 98. The dipstick 102 also includes a level indicator 138 for indicating the level of lubricant in the sump 82. The level indicator 138 includes a ball 142 captured between the grommet 122 and a retention plate 146 coupled to the grommet 122. The ball 142 allows the level indicator 138 to pivot relative to the grommet 122. The dipstick 102 further includes a cap 150 coupled to the grommet 122.

Figure 5:
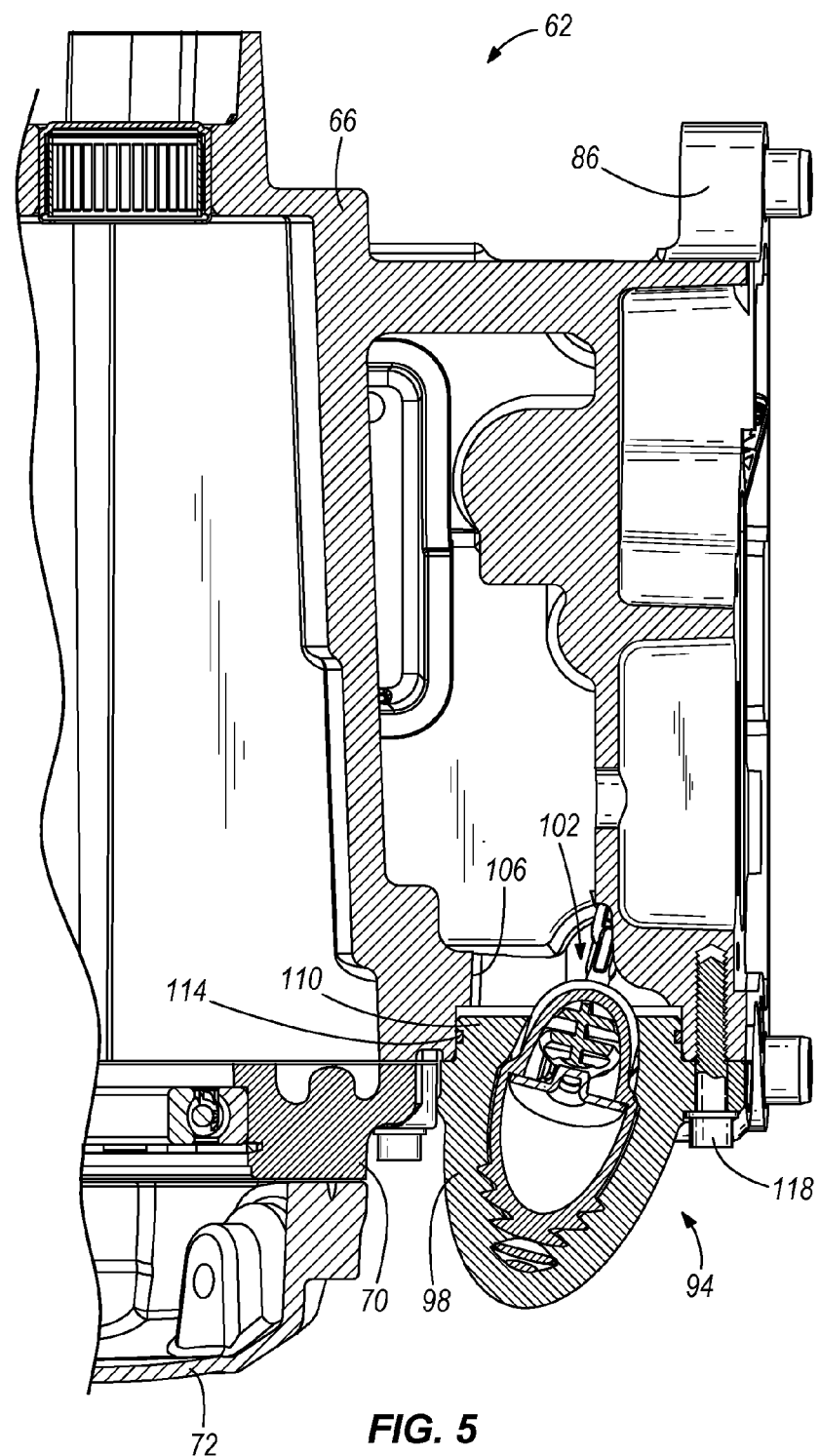
FIG. 5 is a cross-section view taken along line 5-5 of FIG. 3, illustrating a connection configuration of the dipstick assembly to the transmission case.
Figure 6:
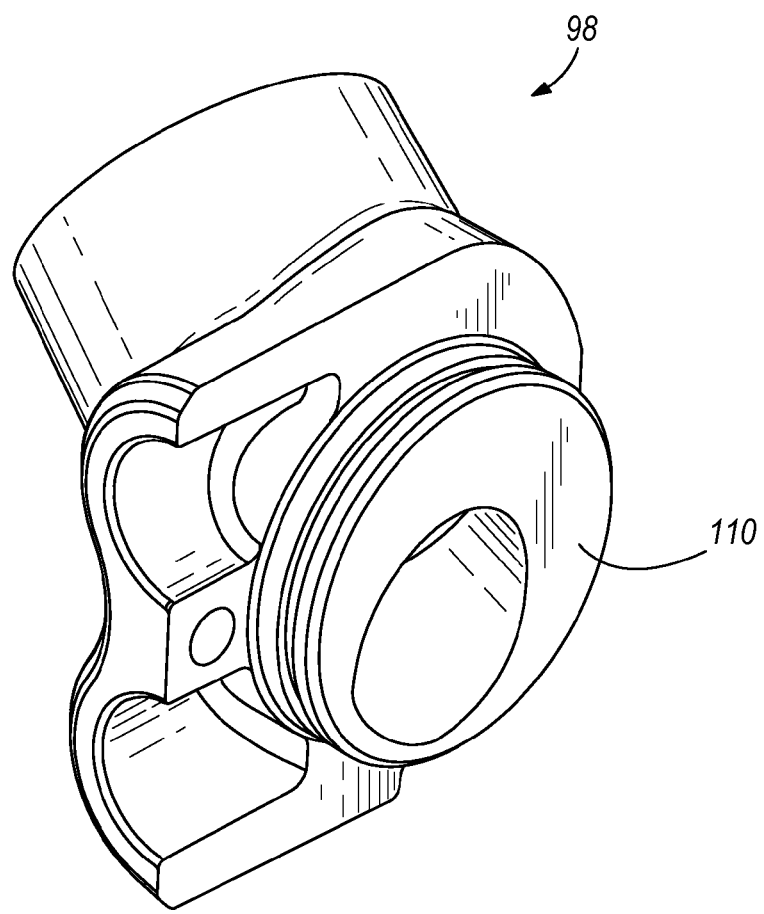
FIG. 6 is an enlarged, rear perspective view of a portion of the dipstick assembly of the transmission case assembly of FIG. 2.

With reference to FIGS. 4-6, the fill spout 98 includes a neck portion 110 that is insertable into the passageway 106 and engageable with the passageway 106. In the illustrated construction, an O-ring 114 is positioned between the fill spout 98 and the passageway 106 to radially compress against the passageway 106 and seal the fill spout 98 to the passageway 106. In addition, a small clearance fit may be utilized to facilitate the fill spout 98 sealing to the passageway 106. The combination of using a small clearance fit between the neck portion 110 and the passageway 106, and using the O-ring 114 to seal the fill spout 98 to the passageway 106 allows the fill spout 98 to be coupled to the transmission case 66 by a single fastener. In the illustrated construction, the fill spout 98 is coupled to the transmission case 66 by a single cap screw or bolt 118 (see FIGS. 2 and 5). Alternatively, other types of fasteners may be utilized instead of the cap screw or bolt 118.

Such a single-fastener connection is possible because the fill spout 98 does not utilize a flat gasket to seal to the passageway 106. A flat gasket typically requires multiple fasteners around the periphery of the gasket to achieve a consistent clamping force around the periphery of the gasket, whereas the O-ring 114 in combination with the small clearance fit between the neck portion 110 and the passageway 106, as shown in FIG. 4, provide sufficient sealing between the fill spout 98 and the passageway 106 without relying on the clamping force provided by the single cap screw or bolt 118.

Various aspects of the invention are set forth in the following claims.

We claim:

1. An engine and transmission assembly adapted for use with a motorcycle, the engine and transmission assembly comprising:
   a crankcase;
   a transmission case coupled to the crankcase;
   a transmission access door coupled to a side of the transmission case; and
   a dipstick assembly coupled to the side of the transmission case, the dipstick assembly positioned between the crankcase and the transmission access door.

2. The engine and transmission assembly of claim 1, further comprising:
   a passageway in the transmission case exposed to the side of the transmission case; and
   a reservoir coupled to the transmission case and in fluid communication with the passageway, the reservoir adapted to contain a lubricant, wherein the dipstick assembly is sealingly coupled to the passageway.

3. The engine and transmission assembly of claim 2, further comprising an O-ring sealing the dipstick assembly to the passageway.

4. The engine and transmission assembly of claim 2, wherein the dipstick assembly includes a dipstick and a fill spout, the dipstick adapted to indicate a level of lubricant in the reservoir.

5. The engine and transmission assembly of claim 1, wherein the dipstick assembly is coupled to the side of the transmission case by a single fastener.

6. The engine and transmission assembly of claim 1, wherein the transmission case includes a flange for coupling to the crankcase, and wherein the dipstick assembly is positioned adjacent the transmission access door and adjacent the flange.

7. The engine and transmission assembly of claim 3, wherein the dipstick assembly includes a fill spout coupled to the side of the transmission case and in fluid communication with the passageway and a dipstick coupled to the fill spout, and wherein the O-ring is radially compressed between the fill spout and the transmission case to seal the fill spout to the passageway.

8. A motorcycle, comprising:
a front wheel;
a rear wheel;
a frame supported by the front and rear wheels;
a crankcase;
a transmission case coupled to the crankcase;
a transmission access door coupled to a side of the transmission case; and
a dipstick assembly coupled to the side of the transmission case, the dipstick assembly positioned between the crankcase and the transmission access door.

9. The motorcycle of claim 8, further comprising:
a passageway in the transmission case exposed to the side of the transmission case; and
a reservoir coupled to the transmission case and in fluid communication with the passageway, the reservoir adapted to contain a lubricant, wherein the dipstick assembly is sealingly coupled to the passageway.

10. The motorcycle of claim 9, further comprising an O-ring sealing the dipstick assembly to the passageway.

11. The motorcycle of claim 9, wherein the dipstick assembly includes a dipstick and a fill spout, the dipstick adapted to indicate a level of lubricant in the reservoir.

12. The motorcycle of claim 8, wherein the dipstick assembly is coupled to the side of the transmission case by a single fastener.

13. The motorcycle of claim 8, wherein the transmission case includes a flange for coupling to the crankcase, and wherein the dipstick assembly is positioned adjacent the transmission access door and adjacent the flange.

14. The motorcycle of claim 10, wherein the dipstick assembly includes a fill spout coupled to the side of the transmission case and in fluid communication with the passageway and a dipstick coupled to the fill spout, and wherein the O-ring is radially compressed between the fill spout and the transmission case to seal the fill spout to the passageway.

* * * * *